No. 821,814. PATENTED MAY 29, 1906.
D. METZGER.
TWISTING MACHINE.
APPLICATION FILED MAY 31, 1905.
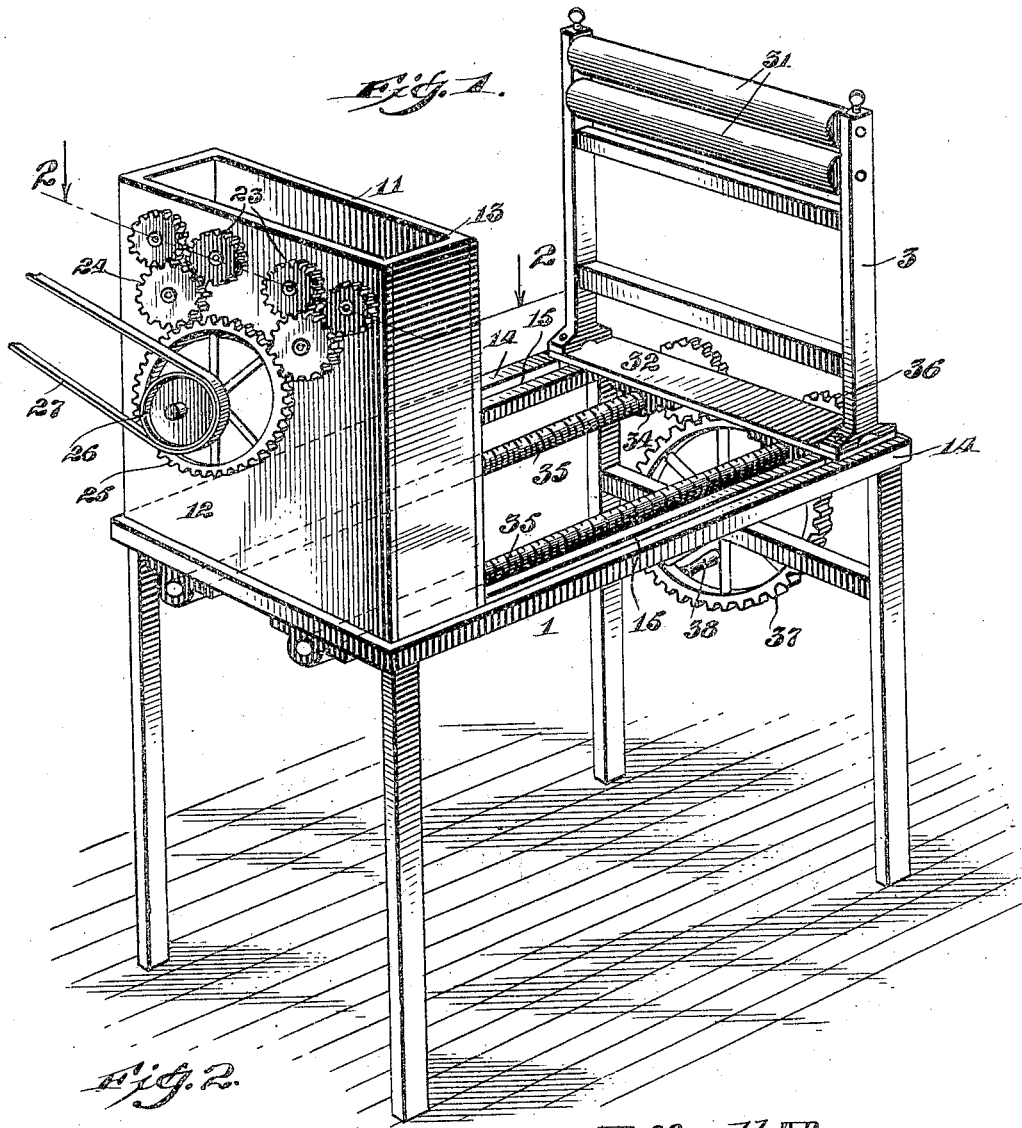
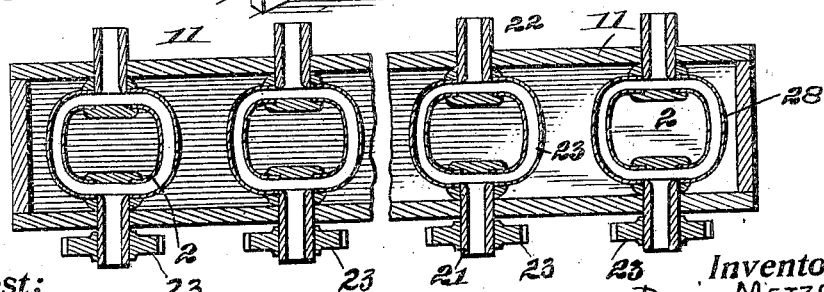
Inventor:
DAVID METZGER
by Dickerson, Brown, Raegener & Binney
Attys

UNITED STATES PATENT OFFICE.

DAVID METZGER, OF NEW YORK, N. Y.

TWISTING-MACHINE.

No. 821,814.	Specification of Letters Patent.	Patented May 29, 1906.

Application filed May 31, 1905. Serial No. 262,974.

*To all whom it may concern:*

Be it known that I, DAVID METZGER, a citizen of the United States, and a resident of the borough of Manhattan, city, county, and State of New York, have invented certain new and useful Improvements in Twisting-Machines, of which the following is a specification.

My invention relates to machines for twisting various articles in continuous lengths, such as chenille, and comprises novel twisting means and novel means for regulating the amount of twist given the chenille.

Figure 1 of the drawings is a perspective view of my invention; and Fig. 2 a horizontal section through the line 2 2, Fig. 1.

In the drawings, 1 designates a frame carrying a box 11, the sides 12 and 13 of which act as bearings for the ends 21 22 of fliers 2. The fliers are shown as four in number, although it is obvious that any desired number may be used. As shown, they are provided at their ends 21 with gears 23, meshing with idler-gears 24 on the side 12 of the box 11, the gears 24 in turn meshing with a driven gear 25, (shown as on the same shaft with a pulley 26,) to which is attached a belt 27, connected to any suitable source of power. (Not shown.) The fliers 2 consist of the tubular ends 21 22, (shown as having bearing in the sides 12 and 13 of the box 11,) the tubular portions 21 and 22 being connected by a curved tubular portion 28, the tubular opening through the parts 21 28 22 being continuous. I have shown the curved intermediate portions 28 as duplicated opposite each other. It is evident that one of these has no function except as a counterpoise to the other. The longitudinal bars 14 of the frame 1 are shown as having grooves 15, in which slides an auxiliary frame 3, carrying a pair of rolls 31, which are parallel with and substantially opposite the fliers 2. Secured on the bottom board 32 of the frame 3 are nuts 34, engaging in screws 35, which run longitudinally of the frame 1. At the ends of the screws 35 are pinions 36, meshing in a gear-wheel 37. (Shown as provided with a handle 38.) It is obvious that by rotating the gear-wheel 37 the auxiliary frame 3 may be moved longitudinally of the frame 1, so that the distance of the rolls 31 from the fliers 2 may be altered as desired.

The operation of my device will be readily understood from an inspection of the drawings.

It is obvious that the chenille is fed through the tubes 21, 23, and 22 and that by the rotation of the fliers 2 the chenille is properly spun. The ends of the spun chenille are then passed between the rolls 31 to reels. (Not shown in the drawings.)

It is obvious that the twisting action of the fliers 2 on the chenille extends to the rolls 21, where the further rotation of the chenille is stopped, so that by increasing or decreasing the distance between the fliers 2 and the rolls 31 the amount of torsion given the chenille can be accurately regulated.

It is obvious that my invention may be embodied in forms considerably different in appearance from that shown in the drawings and that any number of fliers, one or more, may be used, as desired.

It is also obvious that my invention, while described as used for the twisting of chenille, may be used for twisting any other article, particularly where these are in continuous lengths.

By the word "cord," therefore, as used in the claims, I intend to include chenille or any twisted article of like nature.

Without specifying materials or enumerating equivalents, what I claim is—

1. In a twisting-machine, a rotary flier having tubular ends in alinement with each other, and an intermediate curved tubular portion, said curved portion and said ends forming a continuous tubular passage for the chenille in combination with a guide for removing the spun cord from said flier and means for altering the distance between said flier and said guide.

2. In a twisting-machine, a rotary flier having tubular ends forming bearings on which it rotates, and an intermediate curved tubular portion, said curved portion and said ends forming a continuous tubular passage for the chenille in combination with a guide for removing the spun cord from said flier and means for altering the distance between said flier and said guide.

3. In a twisting-machine, a rotary flier having tubular ends in alinement with each other, an intermediate curved portion, said curved portion and said ends forming a continuous tubular passage for the chenille, and a counterpoise for said curved portion in combination with a guide for removing the spun cord from said flier and means for altering the distance between said flier and said guide.

4. In a twisting-machine, a rotary flier, a guide for removing the spun cord from said flier, and means for altering the distance between said flier and said guide.

5. In a twisting-machine, a plurality of rotary fliers, a guide for removing the spun cord from all of said fliers, a frame on which said fliers and said guide are mounted, and means on said frame for altering the distance between said fliers and said guide.

In testimony whereof I have signed this specification in the presence of two subscribing witnesses.

DAVID METZGER.

Witnesses:
SAM B. OSTEN,
ALFRED STEINER.